United States Patent
MacArthur et al.

(10) Patent No.: US 10,050,973 B2
(45) Date of Patent: *Aug. 14, 2018

(54) IMPLEMENTING USER-SPECIFIED TRANSACTION PARAMETERS FOR TRANSFERRING DIGITAL CONTENT ITEMS AMONGST USERS

(71) Applicant: RAKUTEN KOBO, INC., Toronto (CA)

(72) Inventors: Robert MacArthur, Milton (CA); James Wu, Newmarket (CA)

(73) Assignee: RAKUTEN KOBO, INC., Toronto (CA)

( * ) Notice: Subject to any disclaimer, the term of this patent is extended or adjusted under 35 U.S.C. 154(b) by 100 days.

This patent is subject to a terminal disclaimer.

(21) Appl. No.: 15/064,426

(22) Filed: Mar. 8, 2016

(65) Prior Publication Data

US 2016/0191537 A1 Jun. 30, 2016

Related U.S. Application Data

(63) Continuation of application No. 13/930,603, filed on Jun. 28, 2013, now Pat. No. 9,294,793.

(51) Int. Cl.

| H04L 29/06 | (2006.01) |
|---|---|
| H04N 21/254 | (2011.01) |
| H04N 21/4627 | (2011.01) |
| H04N 21/478 | (2011.01) |
| H04N 21/63 | (2011.01) |

(52) U.S. Cl.
CPC ....... *H04L 63/102* (2013.01); *H04N 21/2541* (2013.01); *H04N 21/4627* (2013.01); *H04N 21/47815* (2013.01); *H04N 21/632* (2013.01); *H04L 2463/101* (2013.01)

(58) Field of Classification Search
CPC .......................... G06F 21/10; G06F 2221/0791
See application file for complete search history.

(56) References Cited

U.S. PATENT DOCUMENTS

| 6,865,555 | B2 | 3/2005 | Novak |
|---|---|---|---|
| 7,316,032 | B2 | 1/2008 | Tayebi et al. |
| 8,359,246 | B2 | 1/2013 | Buchheit |
| 8,364,595 | B1 | 1/2013 | Ringewald |
| 8,371,855 | B1 | 2/2013 | Gayles et al. |
| 2012/0042393 | A1 | 2/2012 | Choi |
| 2013/0031643 | A1 | 1/2013 | Rogel et al. |
| 2013/0060661 | A1 | 3/2013 | Block et al. |

*Primary Examiner* — Oleg Korsak
(74) *Attorney, Agent, or Firm* — Oblon, McClelland, Maier & Neustadt, L.L.P.

(57) ABSTRACT

The disclosure relates to a system and a method for implementing user-specified transaction parameters for transferring digital content items amongst users. The method includes: receiving a request from a first user to transfer a right of possession to a first digital content item, wherein the first digital content item includes a content portion and a metadata portion for displaying a visual representation of the first digital content item; in response to receiving the request, precluding user access to at least the content portion of the first digital content item on one or more computing devices associated with an account of the first user; and providing the visual representation of the first digital content item on a display of at least one of the one or more computing devices based on the metadata portion of the first digital content item.

20 Claims, 6 Drawing Sheets

IMPLEMENTING USER-SPECIFIED TRANSACTION PARAMETERS FOR TRANSFERRING DIGITAL CONTENT ITEMS AMONGST USERS

CROSS-REFERENCE TO RELATED APPLICATION

This application is a Continuation of co-pending U.S. patent application Ser. No. 13/930,603 filed Jun. 28, 2013, the entire contents of which are incorporated herein by reference in their entirety.

TECHNICAL FIELD

Embodiments described herein relate to implementing user-specified transaction parameters for transferring digital content items amongst users.

BACKGROUND

Digital content has become pervasive, in that consumers can now purchase various types of digital content items from numerous network or online sources. The distribution of digital content often includes programmatic controls to preclude users from distributing the content themselves.

DETAILED DESCRIPTION

Figure 1:
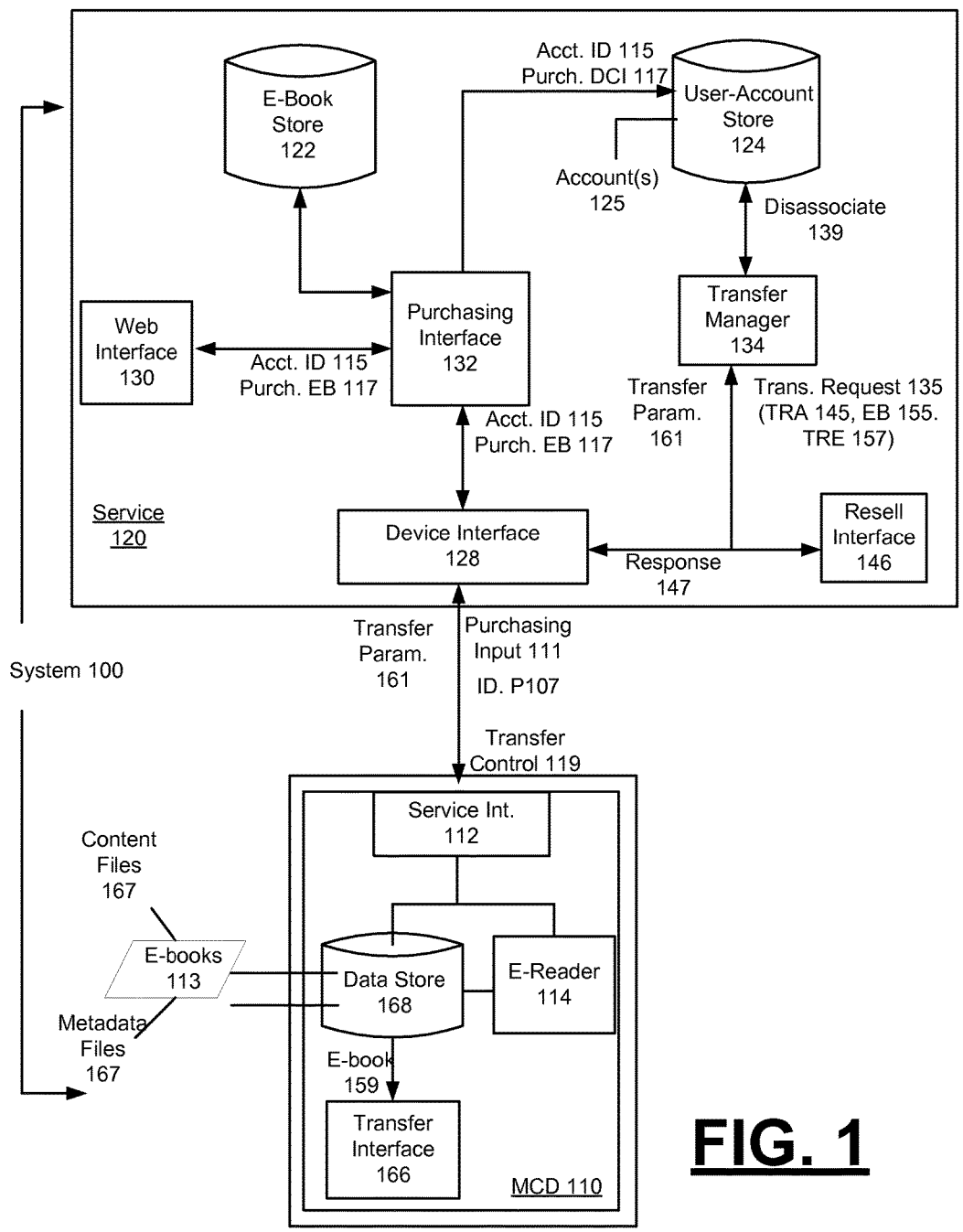
FIG. 1 illustrates a system for enabling a user to transfer a right of possession to a digital content item to another user in accordance with one or more user-specified transaction parameters, according to an embodiment.

Embodiments described herein provide a computing system and/or network environment in which users can transfer (or initiate transfer of) digital content items to other users in accordance with a variety of transaction parameters that are specified by the user. Among other examples, the user can specify a type of transaction (e.g., sale, load or exchange), price or price range, and schedule for when the transaction can be completed.

According to one or more embodiments, a computing device including a set of memory resources, one or more processors, and a network interface. The memory resource including instruction memory that stores a set of instructions. The memory resources also include a data store that stores a collection of digital content items. The one or more processors use instructions stored in the memory to communicate with a network service using the network interface. In communicating with the network service, an identifier is provided to the network service that associates the computing device with an account. A user-interface is generated for configuring a transaction for transferring the right of possession to select digital content items. From a user selection made through the user-interface, a digital content item is identified from a user's library of digital content items. Additionally, a transaction type is identified from the input of the user. The transaction type may correspond to one of a permanent transfer or a temporary transfer. A transfer in the right of possession of the selected digital content item is implemented, in part by performing: (i) if the transaction type is temporary, disable the selected digital content item on the computing device item until a predetermined condition is satisfied; or (ii) if the transaction type is permanent, delete or disable the selected digital content item on the computing device.

In still another embodiment, a programmatic locking mechanism is provided in connection with a digital content item. The programmatic locking mechanism enables at least a portion of the digital content item to be locked to preclude user access, or unlocked to allow user access. A request can be processed from a first user to transfer the right of possession to the digital content item in accordance with one or more terms specified by the first user. In response to receiving the request, the programmatic locking mechanism is controlled to lock at least the portion of the digital content item on one or more computing devices associated with an account of the first user in accordance with the one or more terms specified by the first user.

As used herein, a "digital content item" can be provided in the form of one or more files that include content (e.g., content portion). Digital content items can also include various kinds of metadata (e.g., metadata portion), including metadata for providing a visual representation of the digital content item. With respect to examples described herein, digital content items can include, for example, audio playback content items (e.g., songs), video playback content items (e.g., television shows, movies, music videos), e-books, electronic magazines, digital comic books and multimedia games. While numerous embodiments described herein make reference to e-books, it should be appreciated that e-books are just one example of a digital content item for use with examples as described, and embodiments described herein are applicable to digital content items other than e-books, such as songs (or albums), videos (e.g., movies, television shows, video clips, music videos, etc.), or other works that can be embodied in a digital medium.

"E-books" are a form of an electronic publication that can be viewed on computing devices with suitable functionality. Multi-function devices, such as cellular-telephony or messaging devices, can utilize specialized applications (e.g., e-reader apps) to view e-books. Still further, some devices (sometimes labeled as "e-readers") can be centric towards content viewing, and e-book viewing in particular.

As used herein, a transfer in the right of possession is intended to mean that the right of a given user to enjoy or otherwise consume a content portion of a digital content item is transferable. A transfer in the right of ownership to a particular digital content item can constitute a transfer in the right of possession. However, many examples described herein recognize that consumers do not often purchase true ownership to individual content items, as various digital rights management rules and laws preclude the user from truly owning a purchased copy of a digital content item. For simplicity, some examples may be described in the context of purchasing a digital content item (such as an e-book), and such example should be read in context in which what is actually purchased is a right of possession that permits the user to enjoy or otherwise consume (e.g. read, playback, etc.) a digital content item. When reference is made to a "transferred" digital content item, it is intended to mean that a right to possession of at least a content portion of the digital content item has been transferred. Terms such as "resell" are intended as an example for the transfer in the right of possession to at least the content portion of a digital content item.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

FIG. 1 illustrates a system for enabling a user to transfer a right of possession to a digital content item to another user in accordance with one or more user-specified transaction parameters, according to an embodiment. In an example of FIG. 1, system 100 includes a mobile computing device 110 and a network service 120. The network service 120 can include multiple servers and other computing resources that provide various e-book services, including services in which e-books are sold, re-sold, borrowed, shared, downloaded and/or stored. The mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader component 114 that links the device to the network service 120 and enables e-books provided through the service to be viewed and consumed.

In some implementations, the mobile computing device 110 is equipped with hardware and software to optimize reading electronic content, including e-books. For example, the mobile computing device 110 can have a tablet like form factor, although variations are possible. In some cases, the mobile computing device 110 can also have an electronic paper type display (e.g., E-ink display).

The network service 120 can include a device interface 128, which communicates with individual devices that access the service. Among other resources, the network service 120 can include a network e-book store 122 and a user account store 124. The user account store 124 can associate computing device 110 with a user and an account 125. The account 125 can also be associated with one or more e-books, which can be stored in the network e-book store 122. As described further, the user account store 124 can retain metadata for individual accounts 125 to identify e-books that have been purchased or made available for consumption for a given account. As described with many examples, the metadata can include supplemental transaction information, such as whether the user has purchased or otherwise acquired the right to re-transfer an e-book.

The mobile computing device 110 may be associated with the user account 125, and multiple devices may be associated with the same account. As described in greater detail below, the mobile computing device 110 can store e-books that are purchased or otherwise made available to the user of the mobile computing device 110. The mobile computing device 110 can also locally store other metadata and account information, such as metadata that identifies which e-books the user has the right to re-transfer (e.g., re-sell e-book).

In some embodiments, the network service 120 communicates with an application or other functionality provided on the mobile computing device 110 in order to enable a user to conduct purchasing activity for digital content items made available from or through the network service 120. Specific examples of purchasing activity that can be enabled for mobile computing device 110 include the ability of the user to purchase or otherwise download digital content items, such as e-books, as well as the ability of the user to re-sell or transfer rights to such digital content items to other users. Still further, other types of activities that can be enabled for mobile computing device 110 include an ability to share an experience with the digital content item with other like-minded users.

According to some embodiments, network service 120 can include the web interface 130, a purchasing interface 132, and a transfer manager 134. The purchasing interface 132 can provide functionality to enable users to access and utilize the network e-book store 122. The purchasing interface 132 can be provided as, for example, an online store which interfaces or otherwise uses the network e-book store 122. By way of example, the purchasing interface 132 enables a user to perform various kinds of purchasing activity, including activity to search for e-books, read reviews, make purchases for e-books, and purchase or otherwise acquire right to re-sell purchased e-book. For example, the user can purchase an e-book by making payment and then downloading a digital copy of the e-book to a device associated with the user's account. The purchasing interface 132 can include functionality for linking a user account so as to enable payment, as well as to link a purchase or otherwise downloaded digital content item with the user's account 125. In some examples, multiple devices may be associated with the user's account 125, and the purchased digital content item can be downloaded and/or made available to each device that is associated with the particular user account.

In implementation, mobile computing device 110 can be operated to communicate with device interface 128 to access the purchasing interface 132. For example, the user can operate the mobile computing device 110 to access the online bookstore for an e-reader, or alternatively, for a tablet on which an e-reader application is provided. In one implementation, the user can operate an application on the mobile computing device 110 to specify to network service 120 an identifier 107 that can be used to determine a user's account. For example, the application running on the mobile computing device 110 can be associated with a login that is shared by the user's account, or alternatively the network service 120 can use the identifier 107 transmitted by the mobile computing device 110 to link to the user's account (e.g., link to account identifier 115).

In variations, the user can access the purchasing interface 132 through the web interface 130. For example, the user can access a website corresponding to network service 120, and then make a purchase of a particular digital content item using account identifier 115. Thus, according to various implementations, a user can perform different kinds of purchasing activity through, for example, either the mobile computing device 110 (e.g., application on the mobile computing device) or web browser (to access website).

In one example, a purchasing input 111 can be generated from the mobile computing device 110 in response to use input. On the network service 120, the purchasing input 111 can be communicated via the device interface 128 to the purchasing interface 132. The purchasing input 111 can be directed towards a purchasing activity, such as a search for an e-book, or a request to purchase an e-book, etc. Alternatively, the purchasing input 111 can originate from a user accessing a corresponding website and using a web browser, and communicated to the network service 120 using a web interface 130 (e.g., web page). The purchasing input 111 can be linked to the account identifier 115 of the user, which can be associated with user information stored in the user account store 124. The user information can include transaction information such as the user's credit card account etc.

According to examples described herein, a user can access the network service 120 to (i) purchase or otherwise acquire an e-book (or other form of digital content item), (ii) transfer right of possession to an e-book, and/or (iii) publish an offer to transfer the right of possession to an e-book (e.g., user can publish book available to be borrowed or purchased from user library). The purchasing of the e-book can correspond to the user acquiring a right of possession to read the e-book. In one example, the purchasing input 111 can specify (or be correlated to) the account identifier 115 and a purchased e-book 117 (e.g., specific e-book that is being purchased). The purchasing interface 132 can record the user's purchasing activity in connection with, for example, a purchased e-book 117. Thus, for example, when the user elects to purchase an e-book 117, the transaction can be recorded in the user account store 124 using the account identifier 115 and an identifier for the purchased e-book 117.

Furthermore, in some embodiments, the network service 120 can act as an intermediary that enables transfer of e-books amongst users. As an intermediary, the network service 120 can manage the right of transfer and other digital management considerations. Additionally, the network service 120 can handle transfer of funds as between users.

According to some embodiments, the computing device 110 can include components for communicating with and utilizing services provided by the network service 120. In example of FIG. 1, the computing device 110 includes a service interface 112, an e-reader component 114, a data store 168 that stores a collection of locally stored e-books 113, and a transfer interface 166. The components of the mobile computing device 110 can be provided by, for example, one or more applications that run on the mobile computing device.

In an embodiment, the service interface 112 operates to programmatically locate the network service 120 over one or more networks (e.g., wireless or cellular network and/or Internet). The service interface 112 also operates to communicate and receive communications (e.g., requests, instructions) and data (e.g., e-books) from the network service 120. Among other functions, the service interface 112 signals the identifier 107 that links the particular mobile computing device 110 to the corresponding user account.

The data store 168 can be implemented with memory resources of the computing device. Downloaded e-books, for example, can be communicated from the service interface 112 to the data store 168. At least some of the e-books 113 include a content portion and a metadata portion for providing a computer-generated visual representation of the e-book. For example, individual e-books 113 can include one or more content files 165 and one or more metadata files 167.

The transfer interface 166 enables the user to (i) select an e-book 159 for transfer, (ii) specify transaction parameters 161 to publish an offer for an e-book, and/or (ii) specify transaction parameters 161 to transfer a right of possession to an e-book in the user's collection (e.g., stored with the collection 168) to another user. In some embodiments, the user can provide input to specify transaction parameters 161, such as a transaction type, through use of the transfer interface 166. The transaction type can correspond to one of a temporary transfer or a permanent transfer. A temporary transfer can correspond to the user renting or allowing another user to borrow an e-book. The duration of the transfer can coincide with, for example, a pre-determined duration (e.g., 1 week) or with satisfaction of a pre-determined condition (e.g., until transferor requests e-book return or recipient completes e-book). The pre-determined duration or condition can be specified by the user, recipient or set through default.

Still further, as described with some examples, the transfer type can be specified as an exchange. With an exchange, the network service 120 can pair the transfer of rights as between e-books on different user accounts. The transfer of rights involved in the exchange can be either permanent or temporary.

Another transaction parameter 161 that can be specified through the transfer interface 166 includes an amount of the transaction. For example, the user can specify a desired transaction price for an offer, or an actual transaction type (for a transaction that is completed). The transaction price can correspond to a sale price or a rental price.

Still further, another transaction parameter 1612 that can be specified through the transfer interface 166 includes a calendar or schedule input. For example, the transfer parameters 161 can specify a date on which an offer for an e-book transfer is valid, or valid through. The transfer parameter 161 can alternatively specify, for example, a duration that an e-book can be borrowed, or is to be borrowed.

In one embodiment, transfer interface 166 signals (via service interface 112) a transfer request 135 to the network service 120. The transfer request 135 can be handled by the transfer manager 134 of the network service 120. The transfer request 135 can be made at one time, or in a series of communications, including a request that makes a preliminary determination as to whether the user can transfer the specified e-book (e.g., user cannot re-transfer e-book acquired from another user if e-book is limited to one transfer per sale; user cannot re-transfer borrowed e-book etc.). Thus, if the user does not have the right to transfer the e-book, the preliminary response 147 from the transfer manager 134 of network service 120 can be to deny the request.

In some implementations, the transfer request 135 can correspond to a request to make an offer available to a user, or group of users. As an addition or alternative, the transfer request 135 can correspond to a request to transfer an e-book 155 for which the user has previously purchased. Accordingly, transfer request 135 can specify the user (or transferor) account 145, and the particular e-book 155 that the user is requesting to transfer. The request can also specify transaction parameters 161, such as the transaction type (e.g., permanent or temporary), the transaction price and/or other conditions of the transfer. Additionally, the request 135 can specify the account or location of the transferee. In some implementations, the transfer manager 134 references the request 135 to the user-account store 124 in order to determine if the user has the right to transfer the specified e-book (e.g., whether the e-book was purchased by the user, and/or whether the user purchased an option for the e-book). Assuming the user has the right to purchase the e-book, the transfer manager 134 implements operations to transfer the e-book.

Based on the transaction type, the transfer request can be temporary (e.g., reversed at a later time) or permanent. The transfer manager 134 can implement processes to enable or facilitate the transfer of e-books amongst users in accordance with rules that preclude unauthorized duplication of the e-book amongst different user accounts. The transfer manager 134 can include processes for implementing the transfer of rights to a particular e-book from one user to another, in accordance with rights management policies of, for example, the e-book publisher and/or network service 120. For example, with reference to FIG. 1, many e-books provided through the network service 120 may be provided with a right of possession that is specific to a user or an account. In many cases, for example, the right of possession allows the user to obtain copies on one or more devices that are linked to the user's account. Typically, however, the right of possession conveyed from the network service 120 prohibits or limits the ability of the user to copy or duplicate the e-book on other computing devices that are not linked to the user's account.

Additionally, the transfer manager 134 implements the transfer of the right of possession in accordance with specific transactions parameter 161 provided through the transfer interface 166 of the mobile computing device 110. The specified transaction parameters 161 can include transaction type, conditional parameters, pricing, calendar information etc. Temporary transactions, for example, can be implemented when one user allows another user to borrow or rent an e-book. Permanent transactions, for example, include transaction types such as re-selling or exchanging e-books.

In implementing the transfer, the transfer manager 134 signals transfer control 119 to the computing device 110 to delete or lock at least access to a transferred (or to be transferred) content item. For example, the transfer control 119 can lock the content portion 165 of the e-book 113 that is being transferred. The transfer manager 134 can also implement the transfer by disassociating the specified e-book 155 in the transfer request 135 from the transferor user account 125.

For permanent transfers, the transfer manager 134 can trigger the transfer control 119 to (i) delete or lock at least the content portion of a digital content item on one or more devices of the transferor user; and/or (ii) add the digital content item to the account of the recipient of the user (e.g., enable the recipient user to download the e-book at a later time).

For temporary transfers, the transfer manager 134 can implement an initial transfer as between the transferor user and the recipient user, then implement a partial or full reversal of the transfer once one or more conditions of the transfer are satisfied. In one implementation, the transfer manager 134 triggers the transfer control 119 to add or unlock the digital content item on the one or more devices of the transferor user. Additionally, the transfer manager 134 can trigger the transfer control 119 to delete or lock the digital content item on the device(s) associated with the account of the recipient of the user. The conditions for implementing the reverse transaction include, for example, (i) completion of a duration of time specified by the transferor user at the initial transaction (e.g., how long an e-book can be borrowed), (ii) input from one or both of the users, or (iii) detection of an event, such as the recipient user completing the e-book.

For transaction types that correspond to exchanges, the transfer manager 134 can implement two sets of transfers, which can be either permanent or temporary. One set of transfers deletes or locks a first e-book on the device(s) of a first user, then adds or unlocks the first e-book on the device(s) of a second user. Another set of transfers deletes or locks a second e-book on the device(s) of the second user, then adds or unlocks the second e-book on the device(s) of the first user.

The transfer manager 134 can also perform steps to add or associate the subject e-book to the transferee account 157. For example, the transferee may have an existing account with the user account store 124, and the transfer manager 134 may associate data in the user account store 124 to enable the transferee user to download the e-book from the network e-book store 122 (e.g., through the purchasing interface 132). Alternatively, the transfer manager 134 can implement, or communicate with other processes that implement issuance of a coupon or receipt for redemption of the e-book from an online bookstore.

In implementing processes to transfer the right of possession from one user (transferor) to another (recipient), the transfer manager 134 can also implement conditions or criteria of the transfer. Such conditions or criteria can include those that need to be satisfied initially, such as fund transfer or exchange. Additionally, the conditions or criteria include those that may be satisfied after the transfer is implemented, such as the passage of time (for temporary transfers).

Additionally, the transfer manager 134 can perform steps for distributing funds in connection with the transfer. In one embodiment, the transfer request 135 (or follow on communication) specifies funds that are (or are to be) exchanged between the transferor and the transferee. Depending on implementation, the transfer manager 134 can distribute funds using a variety of formulas or distribution algorithms.

For example, a designated portion of the proceeds can be distributed to the publisher and/or operator of the network service 120.

Figure 2:
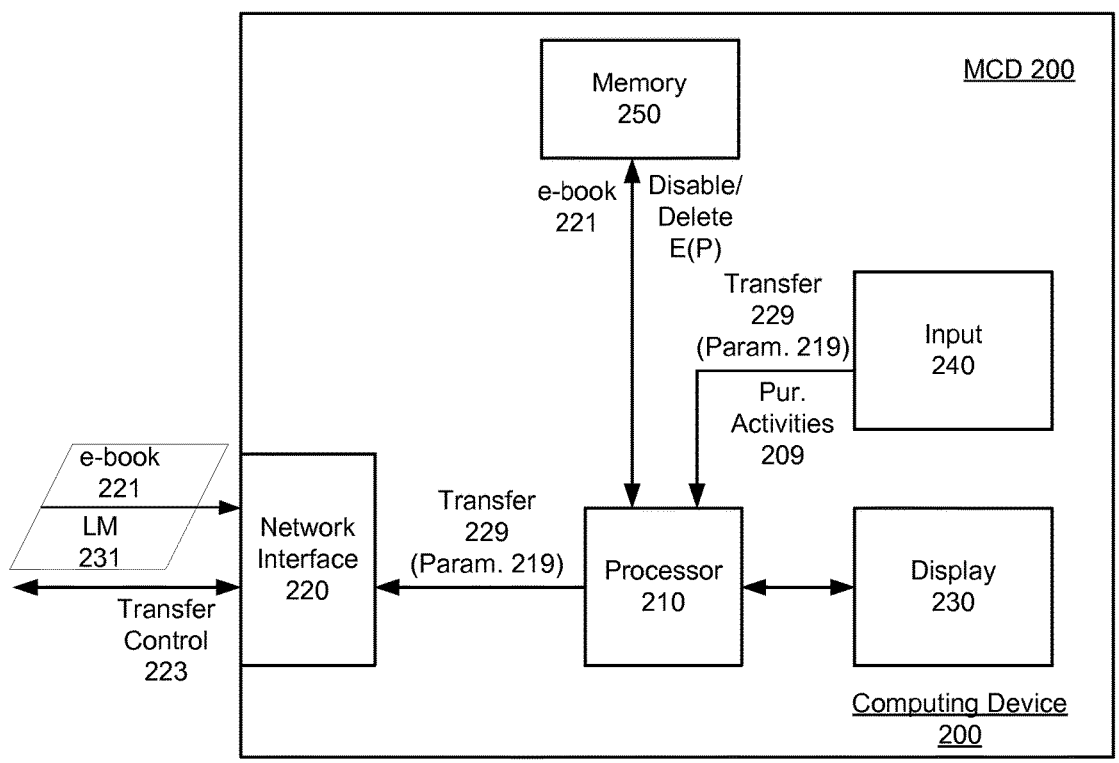
FIG. 2 illustrates an example of a mobile computing device in accordance with examples described herein.

FIG. 2 illustrates an example of a mobile computing device in accordance with examples described herein. A computing device 200 can include a processor 210, a network interface 220, a display 230, one or more input mechanisms 240, and a memory 250. The processor 210 can utilize the network interface 220 to communicate with a network service 120 (see FIG. 1). Accordingly, the computing device 200 provides an example of mobile computing device 110 (as shown with FIG. 1), for use with network service 120. In communicating with the network service 120, the mobile computing device 200 can receive e-books 221 that the user has purchased or otherwise selected to download from the network service.

In some embodiments, the e-books 221 can be provided with a locking mechanism 231 that enables at least the content portion of the content items to be locked from user access. The locking mechanism 231 can be triggered (e.g., from a network) to lock the e-books. For example, the network service 120 may provide transfer control signal 223 to lock the locking mechanism 231 of a given e-book 221.

The memory 250 includes instruction memory for storing instructions from which programmatic operations are performed by the processor 210. Among other functionality, the memory 250 can store instructions that enable the processor 210 to implement programs in accordance with an example of FIG. 1 or FIG. 3.

Additionally, the e-books 221 that are downloaded onto the mobile computing device 200 may be stored in the memory 250. The memory 250 can provide a data store that stores records corresponding to individual e-books. The individual records of each e-book can link content files and metadata files.

The processor 210 can execute programs by reading instructions from the memory 250. Additionally, the processor 210 may perform read operations on the memory 250 in order to retrieve stored e-books to 221. The retrieved e-books 221 can be rendered on the display 230.

The display 230 can correspond to, for example, a liquid crystal display (LCD) that illuminates in order to provide content generated from processor 210. In alternative variations, for example, the display 230 can correspond to an electronic paper type display, which can be designed to mimic conventional paper in the manner in which they display content. Examples of such display technologies include electrophoretic displays, electrowetting displays, and electrofluidic displays. Examples described herein further appreciate that the media in which electronic type displays are provided can vary, and include, for example, plastic or paper combined with transistor elements or other circuitry.

In some embodiments, the user may operate the mobile computing device 200 to enter input corresponding to purchasing activities 209. Such activities can include purchasing e-books 221, re-selling (or offering for resale) purchased e-books, and acquiring options to re-sell purchased e-books. In one implementation, an application on the computing device 200 enables the user to access an online bookstore. The user may have an account established with the online bookstore. The user may operate the mobile computing device 200 to view and/or purchased e-books for consumption on the device (as well as other devices that may be linked to the same account). For example, the user may be able to purchase an e-book by operating an application on the computing device 200. In response to purchasing an e-book, the e-book 221 may automatically be downloaded to the device 200. As described with examples, each downloaded e-book 221 can include a content portion and a metadata portion. When the user downloads the e-book, the user may also acquire the right to read the content portion of the e-book.

In some embodiments, the user can also enter input to transfer 229 a purchased or downloaded e-book. The transfer 229 can be specified with one or more transaction parameters 219, such as parameters that designate a transaction type (e.g., temporary or permanent), transaction price, schedule or calendar and/or price. Typically, the downloading of the e-book is specific to a user, user device or user account. Once the e-book is transferred, the computing device 200 can receive transfer control signal 223 from the network service 120. The transfer control signal 223 can cause, for example, any one or more of the following: (i) delete the content portions of the local copy of a specified e-book that was transferred, (ii) disable or programmatically lock the content portions of the contents (e.g., preclude viewing of some or all pages of an e-book) of an e-book that was transferred, or (iii) disable/delete some but not all content (e.g., enable viewing of insert of select pages, first chapter etc.) portions of the transferred e-book. In some embodiments, the locking mechanism 231 provided with the individual e-book can be signaled to lock, so as to preclude user access to the content portion of the corresponding e-book.

Figure 3:
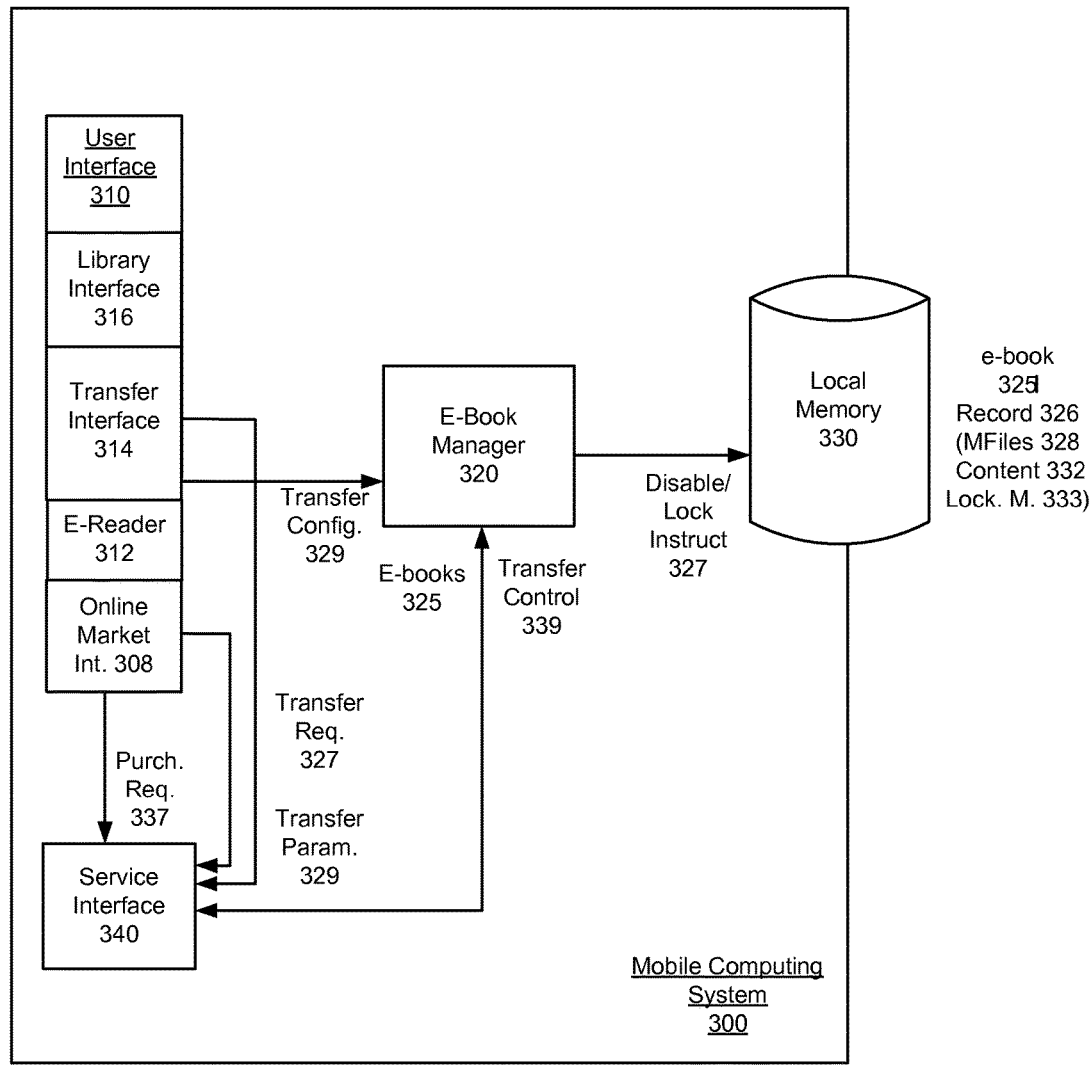
FIG. 3 illustrates an example device system to provide an interface to specify one or more transaction parameters for transferring e-books to other users, according to an embodiment.

FIG. 3 illustrates an example device system to provide an interface to specify one or more transaction parameters for transferring e-books to other users, according to an embodiment. In reference to FIG. 3, In reference to FIG. 3, a mobile computing device can implement the system 300 using programmatic components that enable communications with an e-book service (such as network service 120, shown in FIG. 1). In an example, the mobile computing system 300 can implement programmatic components for implementing purchasing activities that include purchasing e-books, and implementing transfer of rights to purchased e-books. The mobile computing system 300 can implement some or all of its purchasing activities through communications with an e-book service (such as network service 120, shown in FIG. 1).

In an example of FIG. 3, the mobile computing system 300 includes a user interface 310, an e-book management module 320, a local memory 330, and a service interface 340. In some implementations, the programmatic components shown with the computing system 300 can be provided as part of an application that runs on the computing system 300. For example, the user can download an application onto mobile computing device, to obtain functionality such as described herein, as well as to communicate with a network service 120. Alternatively, the application can be embedded or otherwise preinstalled with other programmatic elements for providing such functionality on a computing device. Still further, in some variations, some or all of the functionality described with the mobile computing system 300 can be implemented on or through a network service 120.

The service interface 340 includes application and logic which enables the device to use, for example, a wireless Internet connection, to connect to the network service 120 (see FIG. 1). In connecting with the service, the service interface 340 can transmit data that enables the network service 120 to identify mobile computing system 300 (or alternatively the user) so that the network service 120 can determine the account associated with the mobile computing device. The service interface 340 can be used to retrieve e-books 325 from the network service 120. For example, in identifying the mobile computing system 300 to the network service 120, the network service procures (or uses stored) payment information (e.g., stored credit card) that can be used to charge users account when purchasing a new e-book. Each e-book 325 can correspond to, for example, a literary work, having pagination and chapter designations. Optional media components, such as images, can also be included in the e-book. Other forms of text-based content which can be implemented in connection with examples described herein include electronic magazines and electronic comic books. Other kinds of digital content items can also be used in connection with examples such as described with FIG. 3, including audio and/or video media (e.g., songs, televisions shows, movies).

The mobile computing system 300 stores acquired e-books 325 in the local memory 330. In one example, each e-book 325 is associated with a record 326 that links a set of files, including a metadata file 328 and a content file 332. Additionally, each e-book 325 can be provided with a locking mechanism 333, which enables at least the content portion of the e-book to be locked. The metadata file(s) 328 can include text information about the content file 332, such as, for example, an author of the e-book, a title, summary and reviews. The metadata 328 can also include imagery for generating, for example, an iconic visual representation of the e-book. The imagery can, for example, be derived from an illustration provided by a publisher (or publishing or creative source) of the particular e-book in the context of marketing the e-book or an alternative medium counterpart (e.g., hardback, paperback etc.). In some embodiments, the content 332 corresponds to one or more files that specify pages or chapters of the e-book 325. Likewise, the metadata 328 include files that include the supplementary information, such as the imagery or jacket art.

In identifying the mobile computing system 300, the network service 120 can identify what e-books belong to the account of that device. E-books 325 that are transmitted to the mobile computing system 300 include those that are purchased from the device, such as those that the user purchased directly from or through the network service 120. In variations, e-books 325 can be automatically downloaded to the device in response to the occurrence of certain conditions. For example, the user can purchase an e-book on another device, and then subsequently connect to the network service 120 via the mobile computing system 300 to automatically receive their previously purchased e-book. Alternatively, network service 120 can be configured to push e-books to the mobile computing system 300, based on, for example, user account settings, subscription rules, and various other business logic considerations. The e-book management module 320 can manage the storage of downloaded e-books in the local memory of the mobile computing system 300 for subsequent use.

In some embodiments, the user interface 310 includes functionality corresponding to an online market interface 308, an e-reader 312, a transfer interface 314 and a library interface 316. The online market interface 308 may provide a link (e.g., via service interface 340) to network service 120 to enable the user to readily access an online store for e-books. The online market interface 308 can enable the user to purchase e-books, and to effect downloads of purchased e-books to the user device. For example, the online market interface 308 may display content corresponding to a catalog of e-books available through the network service 120. The user can generate a purchasing request 337 that identifies the selected e-book for purchase. The purchasing request 337 may trigger the network service 120 to charge a user account and provide the selected e-book 325 for download on the user device. In some implementations, the download of the selected e-book 325 provides the user with a right to transfer the right of possession to that e-book to another user, either temporarily or permanently.

The e-reader 312 includes functionality for displaying content of an e-book (e.g., pages). The e-reader 312 can also include other functionality, including enabling interaction such as page or chapter turns, and social media sharing.

The transfer interface 314 enables the user to enter input to initiate or direct a transfer of an e-book in the user's possession to another user to another user. In one implementation, the transfer interface 314 enables the user to specify the e-book, and to communicate the intent for the user to re-transfer the e-book. The user can issue a transfer request 327 via the transfer interface 314, to request the network service 120 enable or otherwise provide for the transfer of the specified e-book.

Depending on implementation, other information can be specified through the transfer request 327, such as the identity of the transferee (e.g., account of transferee) and conditions of the transfer (e.g., re-sell price, gift, etc.). For example, the transfer interface 314 can specify that the network service publish an offer on behalf of the user that identifies an e-book for which the user wishes to transfer, as well as terms (e.g., price, type of transfer) for the offer. Additionally, the transfer interface 314 can specify a transferee account for a user who is to receive the e-book.

Still further, in some examples, the transfer interface 314 enables users to specify transaction parameters 329. Examples of transaction parameters include (i) transaction type (e.g., sale, loan, exchange), (ii) conditions for transfer (e.g., upon receipt of funds, after set date), (iii) calendar input as to when the transaction can be initiated or completed (e.g., window of time), and/or (iv) transaction price or exchange criteria.

In some variations, the user can also operate the transfer interface 314 to generate an offer for the transaction. An offer can specify conditions or criteria corresponding to the transaction parameters 329, but implementation of the transaction may be delayed until the offer is accepted. In such implementations, the transfer interface 314 can specify parameters specific to offer, such as the medium for which the offer is to be communicated, or the group of persons who are eligible to receive the offer or respond to the offer.

The e-book management module 320 manages the storage of e-books 325. When the user issues the transfer request 327, the user may specify the transferee. Depending on implementation, either the network service 120 or the mobile computing system 300 can signal that a transfer is in effect (e.g., transfer made). In one implementation, the network service 120 can signal transfer control 339 to the e-book management module 320. The transfer control 339 can cause the e-book management module 320 to signal to delete or lock at least the content portions 332 of the particular e-book 325 that was subject to the transfer. For example, the transfer control 339 can cause the e-book management module 320 to lock the content portion (or portions thereof) of the e-book, so that, for example, the jacket or graphic art and other metadata associated with the e-book remains. For example, in some implementations, the locking mechanism 333 provided with a specific e-book that is being transferred can be triggered to a locked state. As an addition or alternative, the content portions 332 of specified e-books 325 can be deleted or disabled without deleting or disabling the metadata portions 328 of the same e-books.

In some variations, the metadata portions 328 of all acquired e-books can be made available to functionality such as provided by the library interface 316. The library interface 316 can display visual representations of all previously acquired e-books, including those e-books that the user retransferred (e.g., gifted or resold), using the metadata portions 328 of e-books identified in the collection (e.g., stored in local memory 330). At the same time, those e-books that have been retransferred may have some or all of the corresponding content portions 332 deleted or disabled (e.g., locked).

According to embodiments, the transfer control 339 can be communicated to the e-book management module 320 as a programmatic directive generated from, for example, network service 120. In a variation, the transfer control 339 can be communicated to the e-book manager as an internally generated response to a detected user action.

In some variations, the user-interface 310 and/or e-book management module 320 can include or provide additional functionality or indicia to visual representations of e-books that have been transferred. For example, the metadata 328 associated with a transferred e-book can be provided an (i) an indicia indicative of the transferred status of a particular e-book, and (ii) an active link or other selectable feature to the network service 120 for purpose of identifying the transferred e-book and triggering an automatic re-acquisition process (e.g., re-purchase, terminate exchange or loan/temporary transfer). This allows for the user to reacquire the e-book at a later date.

Methodology

Figure 4:
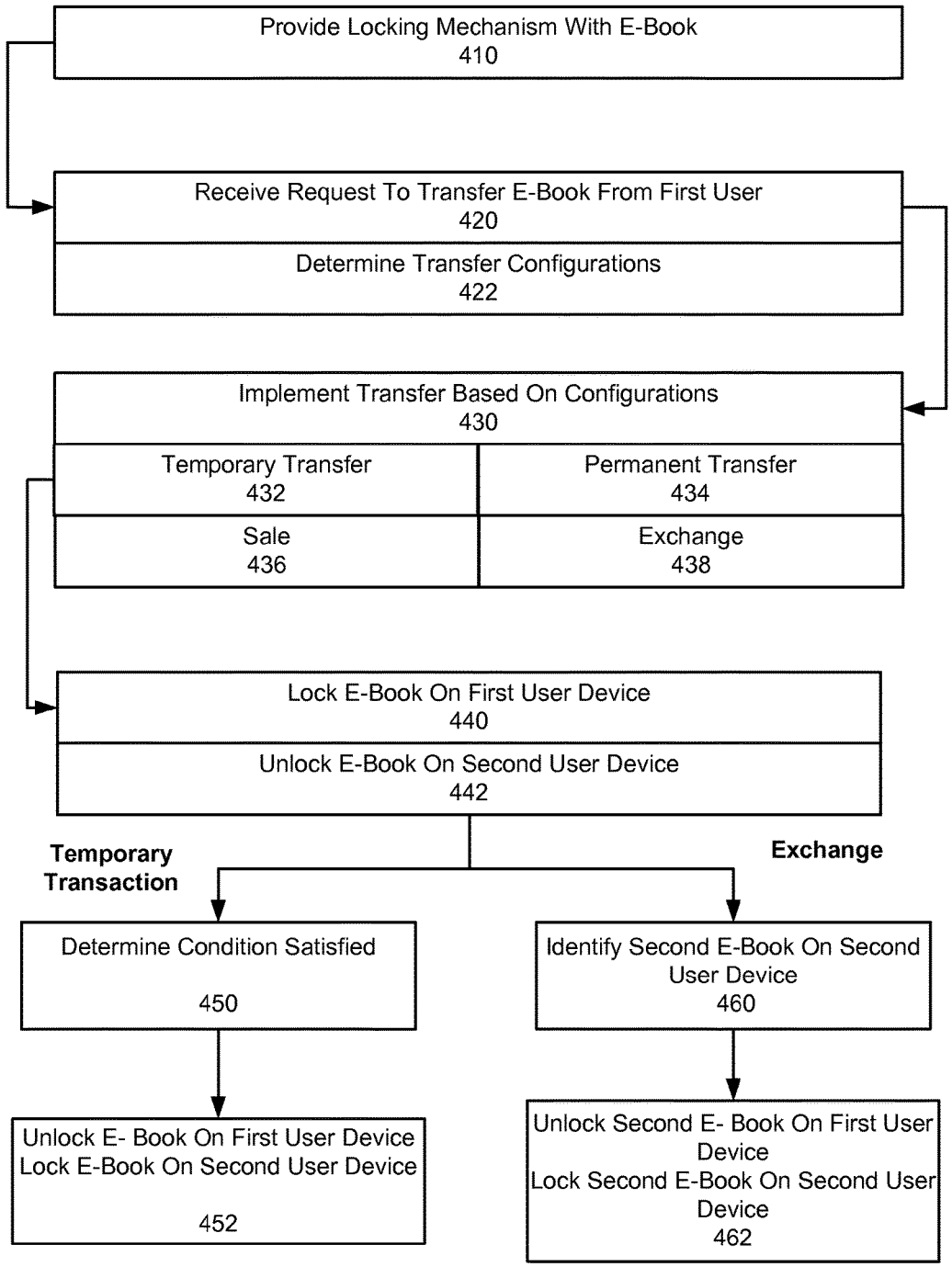
FIG. 4 illustrates an example method for providing e-books with programmatic controls to enable users to re-transfer the e-books in accordance with user-specified transaction parameters, according to an embodiment.
Figure 5:
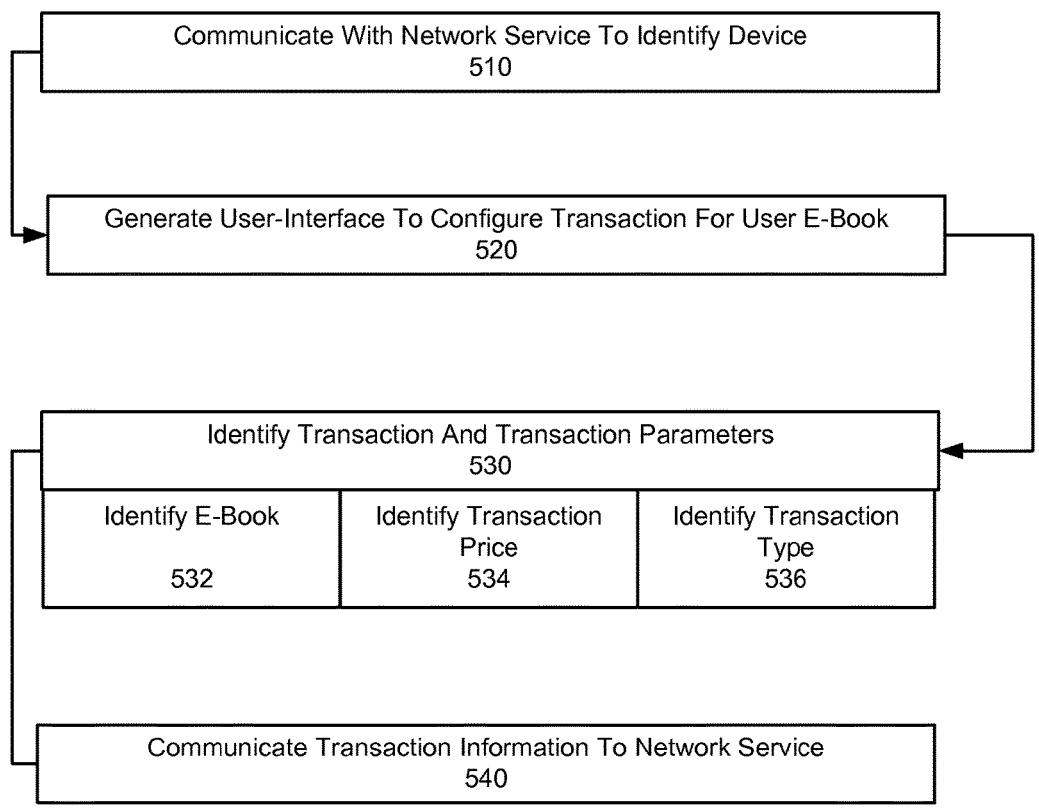
FIG. 5 illustrates an example method for operating a computing device in order to enable a user to specify transaction parameters for the retransfer of an e-book, according to an embodiment.

FIG. 4 illustrates an example method for providing e-books with programmatic controls to enable users to re-transfer the e-books in accordance with user-specified transaction parameters, according to an embodiment. FIG. 5 illustrates an example method for operating a computing device in order to enable a user to specify transaction parameters for the retransfer of an e-book, according to an embodiment. Examples such as described by FIG. 4 or FIG. 5 may be implemented using components such as described with FIG. 1, FIG. 2, or FIG. 3. Accordingly, reference may be made to elements of other figures for purpose of illustrating suitable elements or components for performing a step or sub-step being described.

With reference to FIG. 4, an e-book may be provided to a computing device associated with an account of the user with a programmatic locking mechanism (410). For example, in some embodiments, an e-book downloaded from the network service 120 can include one or more content files and/or metadata files which include an encrypted key that can be locked or unlocked. The network service 120 can signal controls which lock or unlock the locking mechanism of the e-book on a given user device, or set of user devices associated with the user account.

At a given instance, the network service may receive a request to transfer an e-book that is in the possession of a first user (420). For example, the first user may request to transfer an e-book that he or she has downloaded onto a given device. Depending on the implementation, the transfer request from the user can be received as, for example, one of (i) a conditional offer, that the network service 120 can attempt to fulfill (e.g., published to solicit responses from users of the network service), or (ii) a request to complete a specific transfer (e.g. identify transferee by account).

In communicating the request, the user may specify one or more transaction parameters that are to be in effect for the transfer (422). One type of transaction parameters that can be specified by the user includes a type of transaction. Other kinds of transaction parameters that can be specified by the user include, for example, the price for the transaction and scheduling parameters. The transaction parameters can be entered through, for example, an interface component of an application on a user device. When the transfer request corresponds to a conditional offer, the transaction parameters can designate, for example, criteria that must be met in order for the transfer to take place to another user. When the transfer request is to complete a specific transfer, the transaction parameters can specify facets that are to be implemented in affecting the transfer in the right of possession to a specific e-book.

The network service 120 can implement a transfer in the right of possession to an e-book based on the transaction parameters (430). In particular, the network service 120 can determine and implement the transfer in the right of possession of a given e-book by transaction type, as specified by the user. The transaction types can include a temporary transfer (432) or a permanent transfer (434). A temporary transfer can correspond to a loan or rental of an e-book. A permanent transfer can correspond to a sale or gift between one user and another.

Another type of transaction that can be specified by user input includes whether the transfer is to be for monetary considerations (436), or as an exchange (438). In particular, some embodiments enable the user to specify input that designates then e-book is to be exchanged for one or more other e-books.

In implementing the transaction type (specified by the transaction parameters of the user), the network service may perform operations that include locking the e-book on the account of the first user (e.g., user who submits transfer request) (440), and providing (e.g., enabling for download) and unlocking the same e-book on the account of a second user whom is to acquire the right of possession from the first user (442). In some embodiments, a copy of the e-book residing on the device (or devices) of the first user is programmatically locked. For example, the encryption key needed to access the content portion of the e-book can be changed by the network service 120. The result is that the first user can no longer access the e-book while that e-book is in a locked state. At the same time, the second user may be provided the same e-book for download on his or her device (or devices). As with the first user, the download of the e-book may include a locking mechanism.

With regard to the second user, the locking mechanism can be set to an unlocked state in order to enable the second user to receive the transfer in the right of possession from the first user. In some cases, the transfer to the second user may be immediate upon the second user downloading the e-book, in which case the e-book may be provided in an unlocked state. In other cases, the transfer may be conditional, so that the second user may need to comply with conditions or criteria (e.g., such as specified by the transaction parameters of the first user) in order to access the transferred e-book. For example, the second user may need to communicate funds to the first user after receiving the e-book download, and upon communicating the funds, the e-book may be unlocked for the second user. In some embodiments, the unlocking of the e-book with the first user account and the unlocking of the e-book with the second user account can be timed so as to be substantially synchronized. Likewise, in a temporary transfer, the reverse sequence of events can occur when the duration of the exchange is complete.

Depending on the transaction type specified by the transaction parameters, additional steps may be implemented in order to complete the transaction. The duration of the transaction itself (and resulting steps needed) may vary depending on the transaction type. If the transaction type is temporary, the network service 120 may determine when termination conditions exist for ending the temporary transfer (450), then reverse the transaction when the condition is satisfied. In one implementation, the transaction is reversed when the e-book is unlocked with the original transferor, and locked for the recipient/second user (452). For example, the transferor user can specify that the second user receives the e-book for a given duration of time (e.g., one week). As another example, the transferor can specify a condition, such as the second user completing the transferred e-book. The condition can be tracked by the network service and/or programmatically embedded with code include on the transferred e-book (e.g., program file included with e-book), or with the client application (e.g., e-reader 312).

In an example in which the condition for the temporary transfer corresponds to a duration of time, the network service 120 may, for example, automatically track when the timing condition specified in the transaction parameters are complete, then signal the respective devices of the transferor/recipient devices to unlock/lock. Alternatively, the e-book or the client application may carry triggers and programmatic timing mechanisms for implementing the transfer, as configured by the transaction parameters.

According to some implementations, if the transaction type is an exchange, then the network service 120 can implement steps to perform two transactions in a coordinated fashion. In one implementation, for example, the transfer request 327 of the first user identifies a second user, and a second e-book (or e-books) of the second user that are to be subject to the exchange (460). As a condition to the exchange, the second user may agree to provide a similar exchange request. In implementing the exchange, the network service 120 can signal the device or devices of the second user to lock the second e-book (or e-books) on the devices associated with the second user's account. At the same time, the second e-book (or e-books) can be trigged for download on the first user's device (or devices). Thus, the second e-book is unlocked on the first user's device (462). The exchange can be implemented as either a temporary or permanent transaction.

While examples described with FIG. 4 provide for use of the network service 120, the transfer of e-books amongst users can be implemented using alternatives network environments. For example, the e-book files and/or client applications can implement locking and/or unlocking mechanisms, in connection with maintaining the right of possession to an e-book with one user at a time. Furthermore, e-books may be transferred from one user to another user through use of peer-to-peer connections, rather than through download from network service 120. These and other such variations can be implemented in the context of numerous examples provided herein.

With reference to FIG. 5, a computing device having e-reader functionality can be operated in a manner that enables a user to transfer the right of possession of a given an e-book to another user, in accordance with transaction parameters specified by the user. In one implementation, the computing device can operate as an e-reader device and communicate with network service 120 to receive various services related to the use of e-books (510). In communicating with a network service, the computing device can identify itself, and further request services such as to download e-books, and/or to transfer e-books to other users. The identifier communicated by the e-reader device can be associated with an account. The communication between the e-reader device and the network service 120 can include communications over the Internet. By way of example, the e-reader device can correspond to an E-ink device with primary functionality for displaying text content. In variations, the computing device can operate one or more applications that provide e-book functionality on the device.

Figure 6:
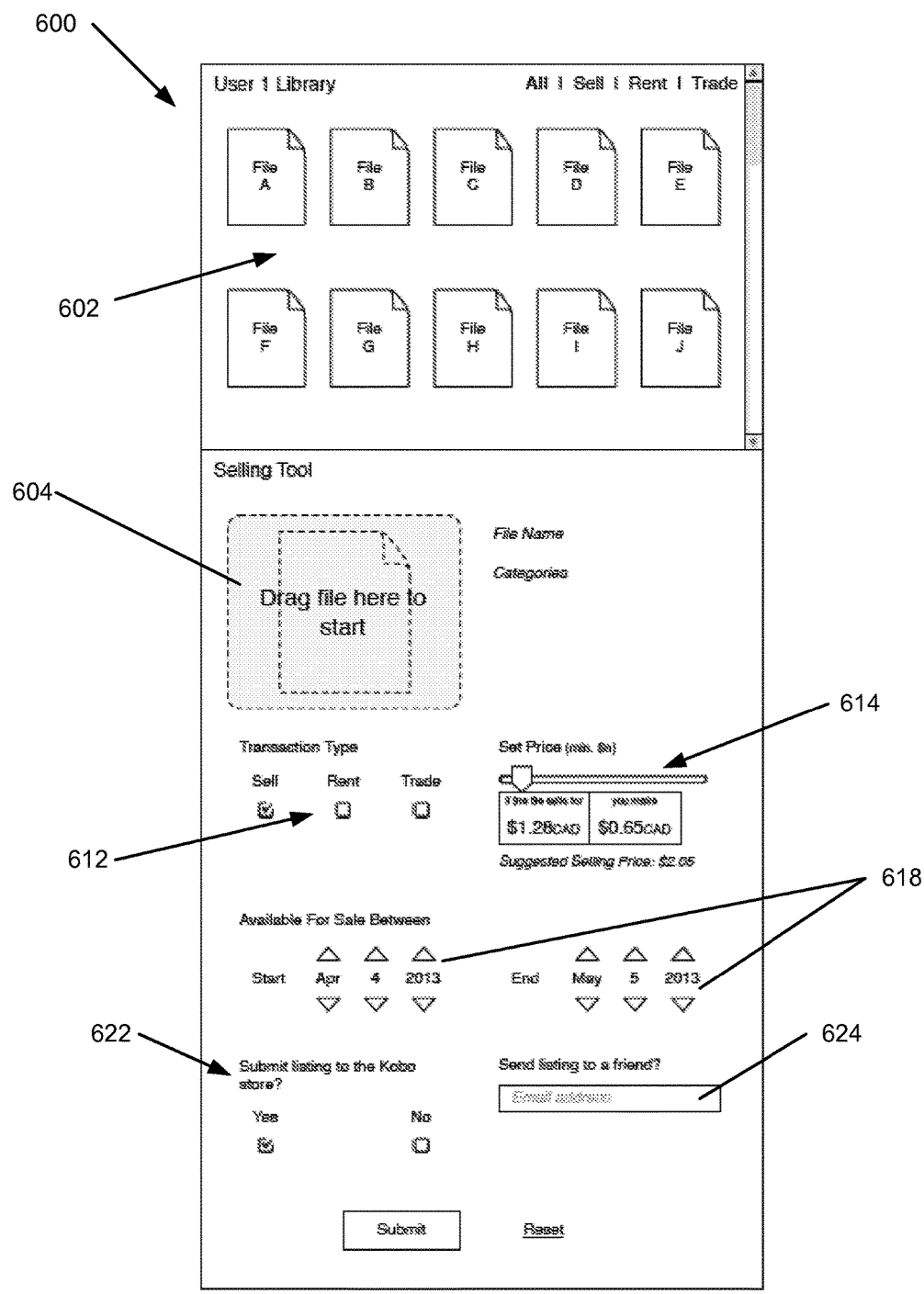
FIG. 6 illustrates an example of a transaction interface for enabling a user to specify transaction parameters for generating an offer to transfer an e-book to another user, according to an embodiment.

The computing device can provide an interface to enable a user to transfer an e-book that is downloaded onto that device or otherwise associated with the account linked to the computing device (520). FIG. 6 illustrates an example of a transaction interface that can be implemented on the computing device. Depending on implementation, the transaction interface can be provided as, for example, a user-interface provided through execution of an application or through a series of functional components provided with multiple interfaces of an application or device.

Based on input received through the transaction interface, the user can specify a transaction, including a set of transaction parameters (530). From the input, the computing device identifies an e-book that the user is intending to transfer (532), a transaction price for the transaction (534) and/or a transaction type (536). The transaction type can include temporary or permanent transactions, such as loans or transfers. The transaction type can also specify an exchange or a fund transfer.

Once the transaction and the transaction parameters are determined, the transaction can be implemented. According to some embodiments, the transaction information, including the transaction parameters are communicated to the network service 120 (540). The network service 120 then implements the transaction parameters, including triggering controls to lock/unlock the e-books on the appropriate devices and accounts.

Transaction Interface

FIG. 6 illustrates an example of a transaction interface for enabling a user to specify transaction parameters for generating an offer to transfer an e-book to another user, according to an embodiment. An example interface such as shown with FIG. 6 can be provided by, for example, the user interface 310 of the mobile computing system 300 (see FIG. 3), or through the e-reader component 114 of the mobile computing device 110 (see FIG. 1).

In an embodiment, a transaction interface 600 includes a library interface 602 and a selection mechanism 604. The library interface 602 can display visual representations (e.g., through metadata files associated with individual e-books) of e-books in the user collection. In examples described herein, one or more (but not necessarily all) of the e-books can be associated with an ability for user to transfer the corresponding right of possession to another user. The selection mechanism 604 can enable the user to select the e-book for transfer through, for example, a click and drag operation or file selection interface.

In selecting the e-book, the user can specify a set of transaction parameters for implementing the transaction. In particular, a set of transaction type options 612 can enable the user to select the type of transaction, such as sell, rent (as an example of temporary transaction) or trade. A price feature 614 enables the user to specify the desired price or price range for an e-book that the user is seeking to transfer.

The user can also specify one or more scheduling parameters 618. For example, the scheduling parameters 618 include a date range for a transaction offer, corresponding to when an e-book is made available for other users who wish to purchase the e-book.

Additionally, the user can specify transaction parameters 622 corresponding to a forum or medium for where the transaction offer is made available. Alternatively, a feature 624 can enable the user can specify a particular individual (e.g., by email address) to receive the transaction offer.

The user can submit the transaction offer. If accepted, the transaction can be implemented in accordance with the transaction parameters specified by the user. For example, a transaction can be implemented as an exchange, or as a rental, depending on selections made by the user. When implemented, a process such as described with, for example, FIG. 4 or FIG. 5 may be implemented in order to execute the transaction in accordance with user-specified parameters.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A system comprising: circuitry configured to:
receive a request from a first user to transfer a right of possession to a first digital content item in accordance with one or more parameters specified by the first user, wherein the first digital content item includes a content portion and a metadata portion at least for displaying a visual representation of the first digital content item;
in response to receiving the request, preclude user access to at least the content portion of the first digital content item on one or more computing devices associated with an account of the first user in accordance with the one or more parameters specified by the first user; and
provide the visual representation of the first digital content item on a display of at least one of the one or more computing devices based on the metadata portion of the first digital content item, along with at least one indicia indicating that the first digital content item has been subject to the transfer of the right of possession, wherein the at least one indicia is configured to trigger an automatic re-acquisition process of the first digital content item upon selection by the first user.

2. The system of claim 1, wherein the circuitry is further configured to:
in response to receiving the request, identify the first digital content item on a device of a recipient who receives the right of possession to the first digital content item from the first user; and
signal the device of the recipient to allow user access to the content portion of the first digital content item.

3. The system of claim 2, wherein the one or more parameters specified by the first user include a duration during which an identified recipient has the right of possession to the first digital content item, and wherein the circuitry is further configured to signal the device of the first user to preclude user access to the content portion of the first digital content item for a time period that is based on the duration.

4. The system of claim 3, wherein the circuitry is further configured to signal the device of the recipient to preclude user access to the content portion of the first digital content item after the time period that is based on the duration.

5. The system of claim 1, wherein the circuitry is further configured to:
provide a user-interface for configuring a transaction for transferring the right of possession to the first digital content item; and
identify, from a user selection made through the user-interface, (i) the first digital content item, (ii) a transaction type for transferring the right of possession to the first digital content item, and (iii) a transaction price.

6. The system of claim 5, wherein the transaction type includes a permanent transfer or a temporary transfer.

7. The system of claim 6, wherein the circuitry is further configured to:
collect funds from the recipient based on the transaction type; and
transfer at least a portion of the funds to the first user.

8. The system of claim 1, wherein the circuitry is further configured to:
process the request from the first user to transfer the right of possession by at least (i) identifying a recipient of the right of possession to the first digital content item, and (ii) identifying a transaction price.

9. The system of claim 1, wherein the circuitry is further configured to:
process the request from the first user to transfer the right of possession by at least (i) identifying a recipient of the right of possession to the first digital content item, and (ii) identifying a second digital content item to which the recipient has the right of possession and for which the first digital content item of the first user is to be exchanged.

10. The system of claim 9, wherein the circuitry is further configured to:
provide the second digital content item to each of the first user and a second user; and
implement an exchange between the first user and the second user by (i) signaling the one or more computing devices of the first user to preclude user access to the content portion of the first digital content item and allow user access to a content portion of the second digital content item, and (ii) signaling the one or more computing devices of the second user to allow user access to the content portion of the first digital content item and preclude user access to the content portion of the second digital content item.

11. The system of claim 10, wherein each of the first digital content item and the second digital content item corresponds to one of an e-book, an electronic magazine, electronic comic book, an audio playback content item, a video playback content item, or a multimedia game.

12. A method comprising:
receiving a request from a first user to transfer a right of possession to a first digital content item in accordance with one or more parameters specified by the first user, wherein the first digital content item includes a content portion and a metadata portion at least for displaying a visual representation of the first digital content item;
in response to receiving the request, precluding user access to at least the content portion of the first digital content item on one or more computing devices associated with an account of the first user in accordance with the one or more parameters specified by the first user; and
providing the visual representation of the first digital content item on a display of at least one of the one or more computing devices based on the metadata portion of the first digital content item, along with at least one indicia indicating that the first digital content item has been subject to the transfer of the right of possession, wherein the at least one indicia is configured to trigger an automatic re-acquisition process of the first digital content item upon selection by the first user.

13. The method of claim 12, further comprising:
in response to receiving the request, identifying the first digital content item on a device of a recipient who receives the right of possession to the first digital content item from the first user; and
signaling the device of the recipient to allow user access to the content portion of the first digital content item.

14. The method of claim 13, wherein the one or more parameters specified by the first user include a duration during which an identified recipient has the right of possession to the first digital content item, and wherein the circuitry is further configured to signal the device of the first user to preclude user access to the content portion of the first digital content item for a time period that is based on the duration.

15. The method of claim 14, further comprising:
signaling the device of the recipient to preclude user access to the content portion of the first digital content item after the time period that is based on the duration.

16. The method of claim 12, further comprising:
providing a user-interface for configuring a transaction for transferring the right of possession to the first digital content item; and
identifying, from a user selection made through the user-interface, (i) the first digital content item, (ii) a transaction type for transferring the right of possession to the first digital content item, and (iii) a transaction price.

17. The method of claim 16, wherein the transaction type includes a permanent transfer or a temporary transfer, and wherein the method further comprises:
collecting funds from the recipient based on the transaction type; and
transferring at least a portion of the funds to the first user.

18. The method of claim 12, further comprising:
processing the request from the first user to transfer the right of possession by at least (i) identifying a recipient of the right of possession to the first digital content item, and (ii) identifying a transaction price.

19. The method of claim 12, further comprising:
processing the request from the first user to transfer the right of possession by at least (i) identifying a recipient of the right of possession to the first digital content item, and (ii) identifying a second digital content item to which the recipient has the right of possession and for which the first digital content item of the first user is to be exchanged.

20. The method of claim 19, further comprising:
providing the second digital content item to each of the first user and a second user; and
implementing an exchange between the first user and the second user by (i) signaling the one or more computing devices of the first user to preclude user access to the content portion of the first digital content item and allow user access to a content portion of the second digital content item, and (ii) signaling the one or more computing devices of the second user to allow user access to the content portion of the first digital content item and preclude user access to the content portion of the second digital content item.

* * * * *